United States Patent [19]

Nakabayashi

[11] 4,121,059

[45] Oct. 17, 1978

[54] SOUND FIELD EXPANDING DEVICE

[75] Inventor: Katsumi Nakabayashi, Kawasaki, Japan

[73] Assignee: Nippon Hoso Kyokai, Japan

[21] Appl. No.: 675,784

[22] Filed: Apr. 12, 1976

[30] Foreign Application Priority Data

Apr. 17, 1975 [JP] Japan ................................ 50-45773

[51] Int. Cl.$^{2}$ ........................................ G11B 31/00

[52] U.S. Cl. .................. 179/100.1 TD; 179/100.4 ST

[58] Field of Search ............ 179/100.1 TD, 100.4 ST, 179/1 G, 1 GP, 1 GQ

[56] References Cited

U.S. PATENT DOCUMENTS

| | | | |
|---|---|---|---|
| 2,093,540 | 9/1937 | Blumlein | 179/100.4 ST |
| 2,246,593 | 6/1941 | Israel | 179/100.1 TD |
| 2,616,970 | 11/1952 | Broos | 179/100.1 TD |
| 2,668,880 | 2/1954 | Friess | 179/100.1 TD |
| 3,214,519 | 10/1965 | Fouque | 179/1 G |
| 3,217,080 | 11/1965 | Clark | 179/100.1 TD |
| 3,236,949 | 2/1966 | Atal et al. | 179/1 G |
| 3,830,978 | 8/1974 | Odagi | 179/100.1 TD |
| 3,943,293 | 3/1976 | Bailey | 179/1 G |
| 3,970,787 | 7/1976 | Searle | 179/1 G |

OTHER PUBLICATIONS

Bauer, Some Techniques Toward Better Stereophonic Perspective, Reprint from IEEE Transactions on Audio, vol. AU-11, No. 3, May 6, 1963.

*Primary Examiner*—Raymond F. Cardillo, Jr.
*Attorney, Agent, or Firm*—Stevens, Davis, Miller & Mosher

[57] ABSTRACT

In a sound field expanding device, left and right channel sound signals of a two channel stereo are respectively divided into several frequency bands, adjusted on levels and phases, mixed again, and then supplied to loudspeakers, so as to reproduce a natural and clear sound field expanded at most into an angle of 180° around a listener. A pair of the expanding devices are used for four channel stereo to form a surrounding sound field. Sound signals derived from the expanding device can be recorded on sound discs or tapes so as to reproduce easily the expanded sound field.

3 Claims, 14 Drawing Figures

SOUND FIELD EXPANDING DEVICE

BACKGROUND OF THE INVENTION (1) Field of the Invention

The present invention relates to a sound field expanding device whereby a sound field formed by two loudspeakers can be expanded to an arbitrarily wide angle, and natural and clear sound images can be obtained.

(2) Description of the Prior Art

When a two channel stereo sound signal is supplied directly to speakers arranged at an oblique angle in front of a listener, the reproduced sound field is restricted between the speakers without regard to the range of the original sound field picked up by the microphones of the recording apparatus.

In addition, if the angle subtended between the speakers is narrower than the original angle substended between the microphones, the reproduced sound field is deformed more narrowly than the original sound field.

Accordingly, it is desired to expand the reproduced sound field so that it will be much greater than the angle subtended between the speakers.

Hitherto, in expanding a sound field formed by a stereo sound signal derived from a conventional two or four channel stereo sound signal source; for instance, from a conventional stereo sound disc, one method of expanding the sound field has been adopted such that crosstalk components having adequate phase or time differences are added respectively to both left and right channel sound signals L and R composing the stereo sound signal. However a defect remains in this method in that localized directions of sound images in the expanded sound field are very obscure, and a remarkably unnatural aural feeling is caused by the out-phase sounds.

On the other hand, by using another sound field expanding method proposed previously, it is required that sound signals to be reproduced are picked up by plural microphones with respectively specified level and phase differences from sound sources. Therefore, it is difficult to apply the proposed method for the purpose of expanding a sound field formed by sound signals derived from a conventional sound disc. Furthermore, in order to reproduce a fairly wide sound field by the above-proposed method, it is necessary to use the same number, at least five, sound image localizing devices as the number of sound sources portions of which should be localized in the reproduced sound field. Therefore, it is expensive to realize a sound field expanded by the above-proposed method.

SUMMARY OF THE INVENTION

An object of the present invention is to realize a sound field expanding device, whereby a sound field formed by sound signals derived from a conventional stereo sound signal source, for instance, from a conventional stereo sound disc can be expanded economically and easily, and natural and clear sound images can be obtained.

Another object of the present invention is to realize a sound field expanding device which is simple and adaptable to a conventional two or four channel stereo sound disc or tape player.

Further another object of the present invention is to reproduce a natural, clear and wide sound field by using loudspeakers arranged to subtend a narrower angle than the original angle subtended between the microphones of the recording apparatus.

Furthermore another object of the present invention is to realize a sound signal recording member, for instance, a sound disc or tape, which can reproduce an expanded sound field by supplying play-backed sound signals directly to loudspeakers.

If is well-known that sound images can be localized by recognizing directions, wherein sound sources are positioned, with regard to level and phase differences of sound pressures caused by the sound sources at the entrances of the ears of the listener.

Accordingly, in a sound field expanding device according to the present invention, for the purpose of forming a sound field expanded remarkably wider than the original sound field reproduced conventionally by the use of loudspeakers arranged around a listener and supplied directly with a two channel stereo sound signal derived from a conventional sound signal source; for instance, a stereo sound disc or tape, at first, left and right channel sound signals composing the two channel stereo sound signal are divided respectively into several components which have respective frequency bands arranged so as to succeed with each other.

These sound signal components of respective channels are adjusted respectively in level and phase in such a manner that respective sound images imposed respectively at the ends of the expanded sound field cause sound pressures at the entrances of the ears of the listener which have level and phase differences corresponding to those at sound pressures caused by the respective sound images which would be imposed respectively on the ends of the original sound field if the ends of the original sound field were shifted to the ends of the expanded sound field.

And then, respective sound signal components adjusted as mentioned above are mixed so as to form mixed output sound signals of respective channels, and these are supplied respectively to respective side loudspeakers arranged obliquely to the front or rear of the listener.

DESCRIPTION OF THE PREFERRED EMBODIMENTS

The present invention is explained in detail as follows with reference to the drawings.

The sound field expanding device according to the present invention is based on the following sound image localizing method.

If a stereo sound field is reproduced by two loudspeakers which are arranged obliquely in front of a listener and are supplied respectively with respective channel sound signals, level and phase differences in successive frequency bands between the respective channel sound signals supplied to the loudspeakers are adjusted in such a manner that the level and phase differences of the sound pressures at the entrances of the ears of the listener, which are caused by a sound image produced in the reproduced sound field, correspond repectively to level and phase differences of the sound pressures at the entrances of the ears of the listener, which would be produced by a real sound source if the real sound source were positioned in the same direction. Consequently, the reproduced sound image can be localized in the direction, wherein the real sound source is practically positioned, by the level and phase adjusting method mentioned above.

According to a conventional sound image localizing method which has been adopted hitherto, several irregular and unnatural aural feelings are caused, because the physical conditions of the reproduced sound images, namely, level and phase differences $\Delta p$ and $\Delta\psi$ of the sound pressures caused at the entrances of the ears of the listener by the reproduced sound images are remarkably different from those of sound pressures caused by real sound sources.

On the other hand, according to the sound image localizing method mentioned above on which the present invention is based, phase and level differences $\theta$ and X between the respective channel sound signals supplied to the respective loudspeakers give the same level and phase differences $\Delta p$ and $\Delta\psi$ of the sound pressures as those produced by real sound sources in order that the above-mentioned physical conditions for localizing of the reproduced sound images are satisfied.

The relations between level and phase differences of sound pressures caused respectively by the reproduced sound image and by the real sound source can be established as follows.

Figure 1:
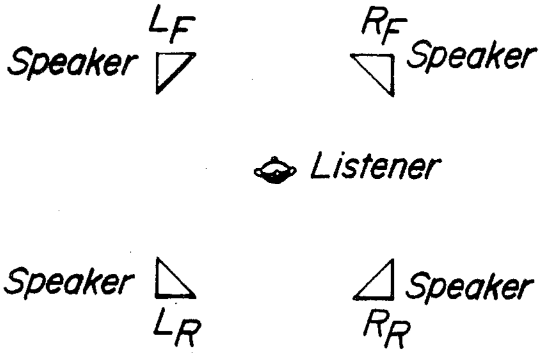
FIG. 1 is a schematic diagram showing a typical arrangement of loudspeakers for a four channel stereo.

FIG. 1 shows a typical arragement of loudspeakers for reproducing a four channel stereo sound field, wherein left and right side loudspeakers $L_F$ and $R_F$ are positioned respectively obliquely in front of the listener and left and right side loudspeakers $L_R$ and $R_R$ are positioned respectively obliquely to the rear of the listener.

Figure 2:
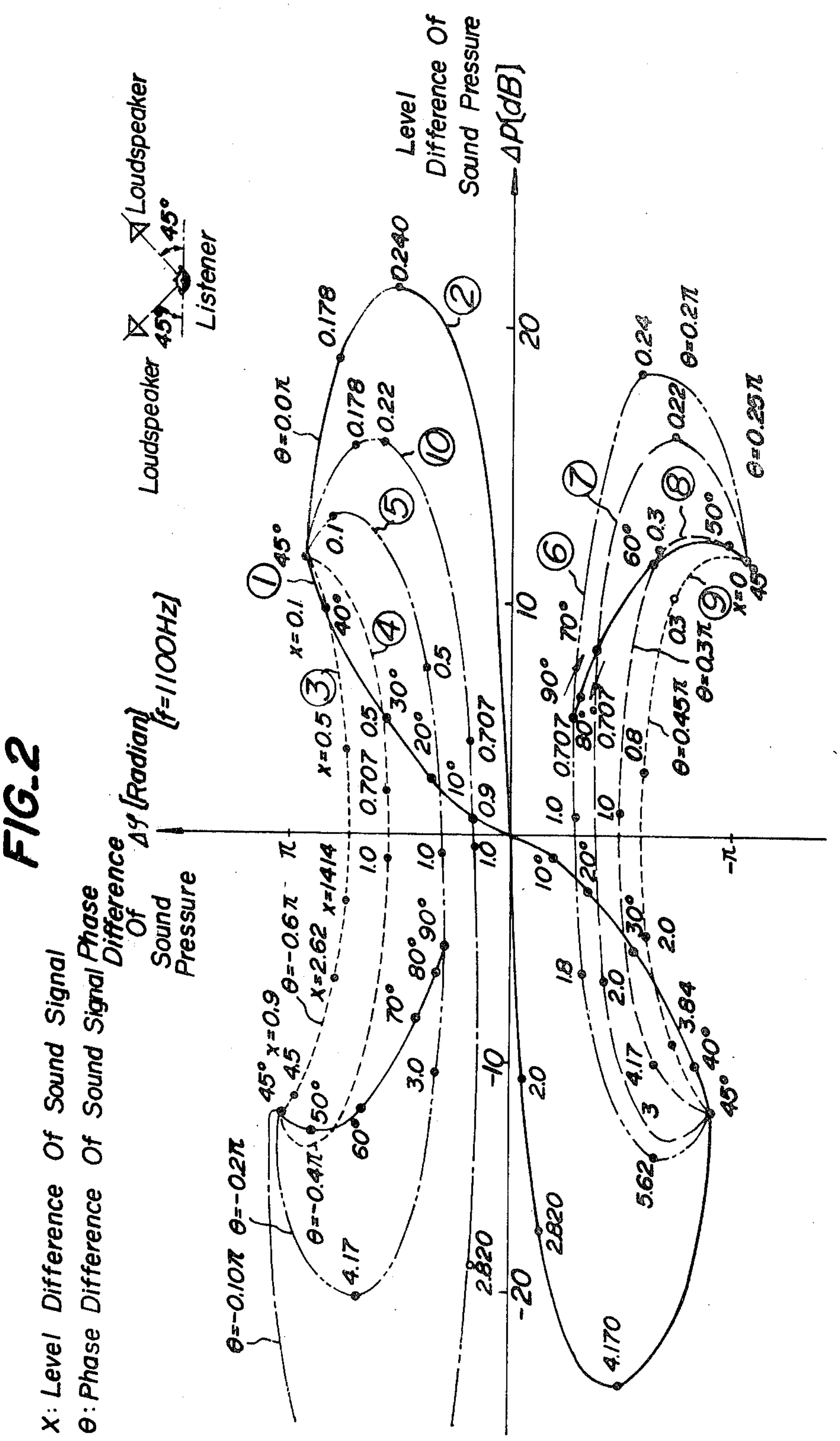
FIG. 2 is a graph showing the relationship between the level and phase differences of sound pressures produced at the entrances of the ears of a listener.

FIG. 2 shows respective characteristics curves relating to the level and phase differences $\Delta p$ and $\Delta\psi$ of the respective sound pressures caused respectively at the entrances of the ears of the listener by the natural sound sources (corresponding to curve ① and the sound images (corresponding to curves ② to ⑩) reproduced by the respective loudspeakers which are positioned as shown in FIG. 2 and supplied with the respective channel sound signals having phase and level differences $\theta$ and X with respect to each other.

Figure 3:
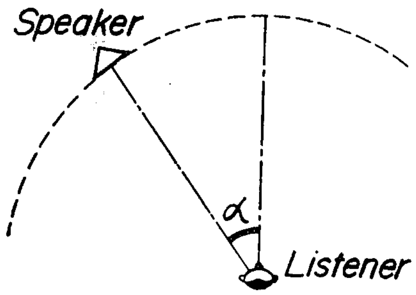
FIG. 3 is a schematic diagram showing the relative position of a loudspeaker producing sound pressures at the entrances of the ears of the listener.

FIG. 3 shows the relative positions of the listener and a single loudspeaker, which moves around the listener with an angle $\alpha$ measured from a line just in front of the listener.

For instance, if a sinusoidal sound signal of 1100 Hz is supplied to the loudspeaker shown in FIG. 3, curve ① in FIG. 2 shows the relationship between level difference $\Delta p$ and phase difference $\Delta\psi$ of sound pressures caused at the entrances of the ears of the listener by the real sound source which moves around the listener. Accordingly, curve ① gives the most natural sound image to the listener. The figures 10° to 90° on curve ① of FIG. 2 show the angles $\alpha$ subtended between the real sound source and a reference line at 0° extending from and in front of the listener, positive values being measured clockwise from the reference line.

On the other hand, curves ② to ⑩ show the relationship between the level differences $\Delta p$ and phase differences $\Delta\psi$ of the second pressures produced when the left and right side loudspeakers LF and RF arranged are positioned respectively obliquely in front of the listener are supplied respectively with respective channel sound signals having the same phase difference $\theta$ and various level differences X. For instance, curve ② in FIG. 2 shows relationship between level and phase differences $\Delta p$ and $\Delta\psi$ of sound pressures caused by the reproduced sound images reproduced by the loudspeakers supplied with sound signals having $\theta=0$ and various values of X. Similarly, curves 3 to 10 show these relationships when the left and right side loudspeakers LF and RF are supplied with respective channel sound signals having various level differences X and the same phase differences $\theta$ of different values respectively corresponding to the relative curves, which values are shown as negative when the sound signal supplied to the left side speaker LF is delayed with respect to the signals supplied to the right side speaker RF. That is, the curves ③, ④, ⑤, ⑥, ⑦, ⑧, ⑨ and ⑩ in FIG. 2 correspond respectively to the signal phase differences $\theta=-0.6\pi$, $-0.4\pi$, $-0.2\pi$, $+0.2\pi$, $+0.25\pi$, $+0.3\pi$, $+0.45\pi$ and $-0.1\pi$. Along respective curves, the values of the ratios X of levels between the respective channel sound signals supplied respectively to the left and right side loudspeakers LF and RF are shown.

As shown in FIG. 2, curve ① corresponding to the real sound source and the others curves ② to ⑩ corresponding respectively to the reproduced sound images show respective loci of the variations of level differences X between the sound signals supplied to the respective side loudspeakers which are remarkably different from each other, and the curve ① crosses respectively all of the other curves ② to ⑩. Thus, the respective points at which curve ① crosses the other curves ② to ⑩ give the phase and level differences which should be provided between the respective channel sound signals supplied to the respective speakers LF and RF so that the sound image reproduced by those respective channel sound signals will be localized respectively in the directions indicated by the values of the angles $\alpha$ at the respective crossing points.

According to the above-mentioned sound image localizing method on which the present invention is based, the respective channel sound signals supplied to the respective speakers in successively different frequency bands are given respectively by the phase and level differences $\theta$ and X settled, which are indicated respectively by the crossing points on the characteristics curve ① providing the level and phase differences $\Delta p$ and $\Delta\psi$ of the natural sound pressures corresponding respectively to the reproduced sound images to be localized.

As a matter of course, the greater the number of crossing points on curve ① that are used for localization of the sound images, the more continuously the reproduced sound image can be localized. Typical values of the level and phase differences X and $\theta$ which should be given between the respective channel sound signals which reproduce the sound images localized respectively in the typical directions are shown in the following Table 1 for the case in which the frequency of the sound signals supplied to the loudspeakers is 1100 Hz.

according to the present invention is explained in detail with reference to FIG. 6.

Figure 4:
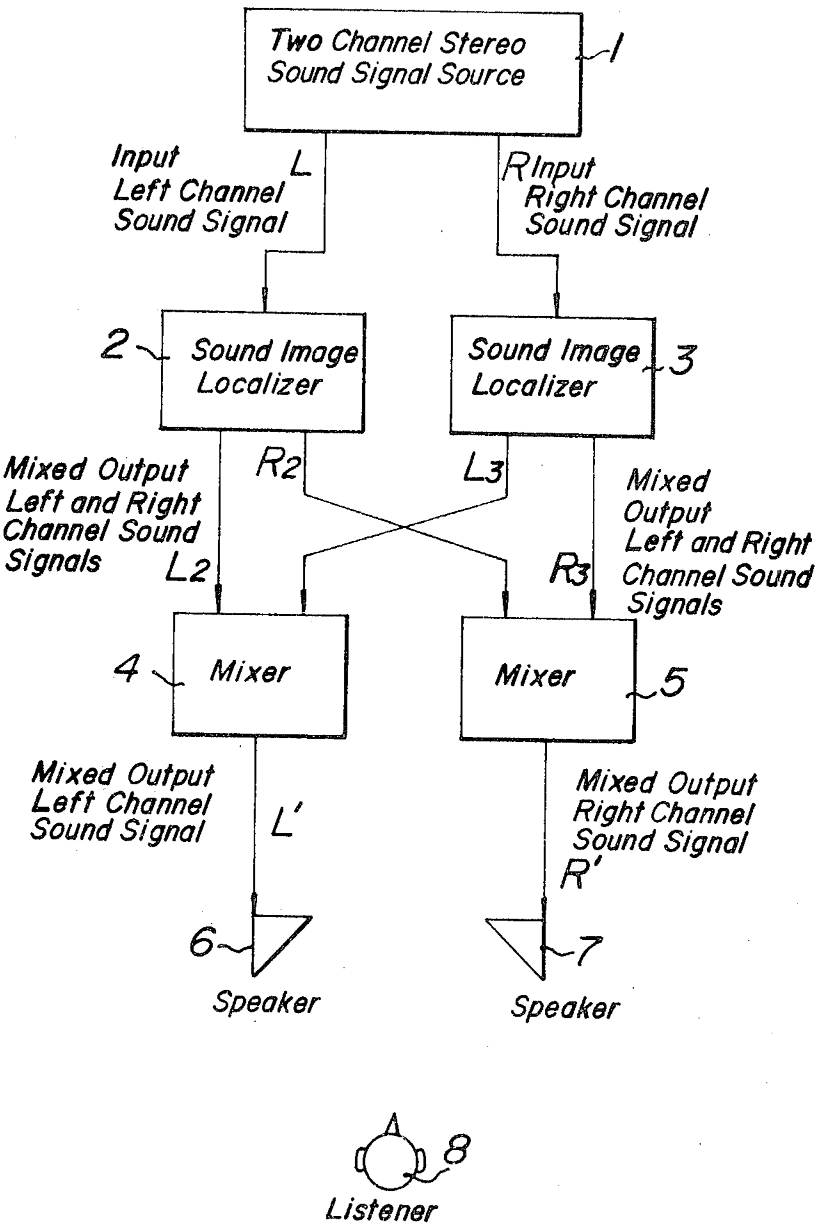
FIG. 4 is a block diagram showing the fundamental arrangement of a sound field expanding device according to the present invention.
Figure 6:
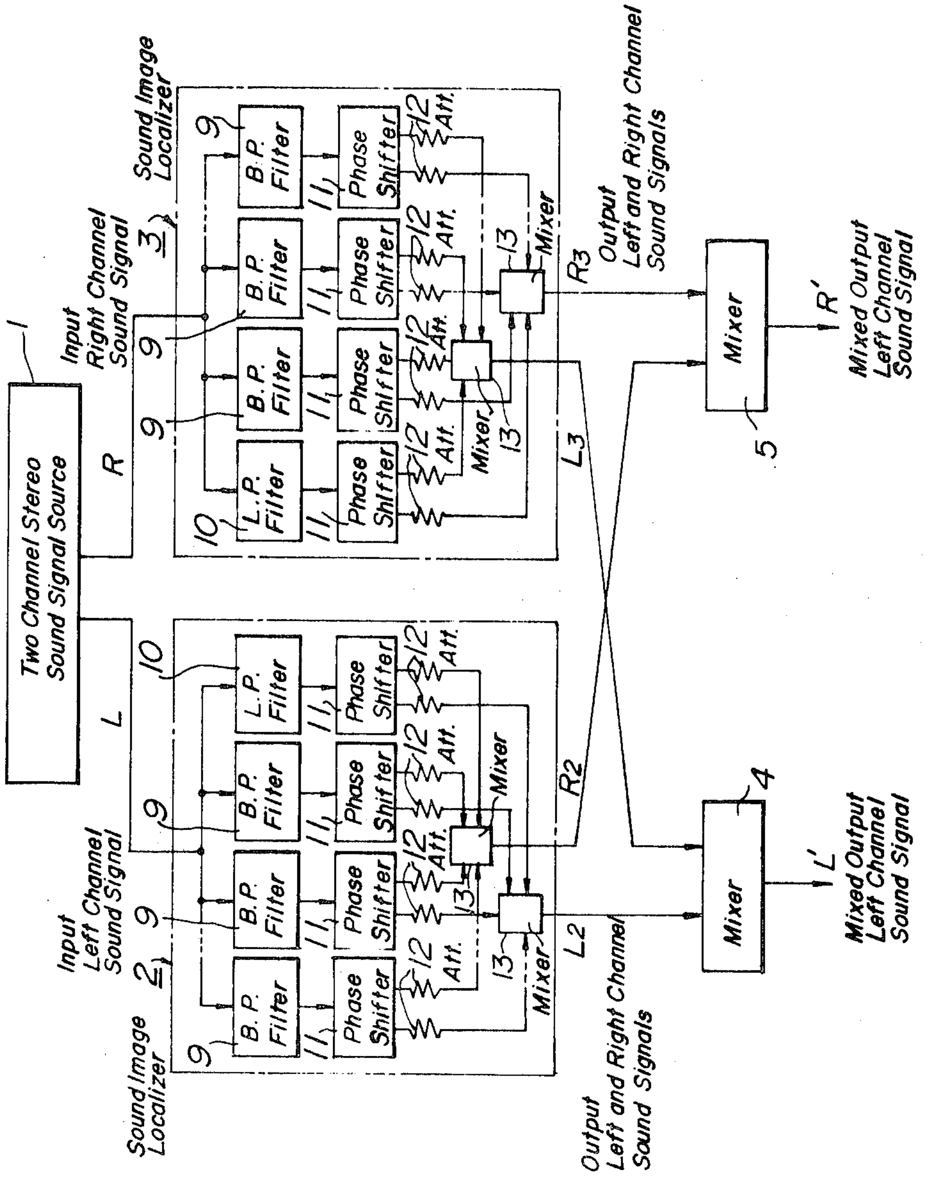
FIG. 6 is a block diagram showing an embodiment of the sound field expanding device according to the present invention.

In FIG. 6, circuit blocks which are the same as those shown in FIG. 4 are shown with the same symbols. In the sound image localizers 2 and 3 shown respectively with surrounding chain lines, 9 and 10 show respectively the band pass and low pass filters mentioned above, 11 shows the phase shifters mentioned above, 12 shows the adjustable attenuators mentioned above, and 13 shows the mixers which mix the adjusted component sound signals of the respective channels in the manner mentioned above.

In FIG. 4, the left and right channel sound signals L and R are supplied respectively to the left and right side sound image localizers 2 and 3, wherein left channel localized output sound signals $L_2$ and $L_3$ and right channel localized output sound signals $R_2$ and $R_3$ are formed respectively by dividing, adjusting and mixing means as described hereinafter. The left channel localized output sound signals $L_2$ and $L_3$ derived respectively from the localizers 2 and 3 are supplied to the left side mixer 4, and the right channel localized output sound signals $R_2$ and $R_3$ derived respectively from the localizers 2 and 3

Table 1

| Direction of Sound Image | 0° | 10° | 20° | 30° | 40° | 50° | 60° | 70° | 80° | 90° |
|---|---|---|---|---|---|---|---|---|---|---|
| Ratio of Signal levels (X) | 1.00 | 0.90 | 0.75 | 0.50 | 0.10 | 0.10 | 0.33 | 0.55 | 0.65 | 0.70 |
| Phase Difference of Signals ($\theta$) | 0 | $-0.100\pi$ | $-0.225\pi$ | $-0.38\pi$ | $-0.60\pi$ | $+0.45\pi$ | $+0.35\pi$ | $+0.25\pi$ | $+0.225\pi$ | $+0.2\pi$ |

FIG. 4 shows a fundamental embodiment of a sound field expanding device according to the present invention based on the sound image localizing method mentioned above, wherein a conventional two channel stereo sound signal source, for instance, a stereo sound disc or tape is used as a two channel stereo sound signal source 1, and whereby a sound field reproduced by left and right channel sound signals composing the two channel stereo sound signal is expanded.

In FIG. 4, sound image localizers 2 and 3 are arranged to implement the sound image localizing method mentioned above. In sound image localizers 2 and 3, respective channel input sound signals are divided into plural component sound signals having respectively different frequency bands, which are successively shifted with respect to each other by low pass and band pass filters, and the levels and phases of respective component sound signals are adjusted by phase shifters and attenuators respectively in response to the characteristic curves shown in FIG. 2, and then are mixed with each other in such a manner that a required number (for instance, two) corresponding to left and right channel sound signals, of mixed sound signals give the desired expanded sound field.

These mixed sound signals derived respectively from the localizers 2 and 3 are mixed again into left and right channel mixed output sound signals by mixers 4 and 5, and then these mixed output sound signals are supplied to the same number of loudspeakers 6 and 7 to reproduce several sound images around a listener 8.

The above-mentioned left and right side sound image localizers 2 and 3 used in the fundamental embodiment shown in FIG. 4 of the sound field expanding device are supplied to the right side mixer 5. The left and right channel mixed output sound signals L' and R' derived respectively from the mixers 4 and 5 as output sum sound signals of these mixers are supplied respectively to the left and right side loudspeakers 6 and 7 positioned separately and obliquely in front of the listener 8. The loudspeakers are driven in such a manner that a new sound field expanded remarkably wider than the original one formed by the original stereo sound signal is formed.

In the case mentioned above, the sound image localizers 2 and 3 are arranged so that following relations are established between the left and right channel output sound signals $L_2$, $R_2$ and $L_3$, $R_3$ derived respectively from the left and right side sound image localizers 2 and 3.

That is, the left and right channel output sound signals $L_2$ and $R_2$, which are derived from the left side sound image localizer 2 and then supplied to the left and right side speakers 6 and 7 can provide a sound image positioned, for instance, on the left side of the listener 8, namely, in a direction of $-90°$ measured counterclockwise with respect to the front of the listener 8 who is assumed to be facing in a direction of zero degree. The is accomplished by adjusting respectively the above-mentioned phase shifters and attenuators comprising the left side sound image localizer 2. Similarly, the left and right channel output sound signals $L_3$ and $R_3$ derived from the right side sound image localizer 3 provide a sound image to the right side of the listener 8, namely, in a direction of $+90°$.

Figure 5A:
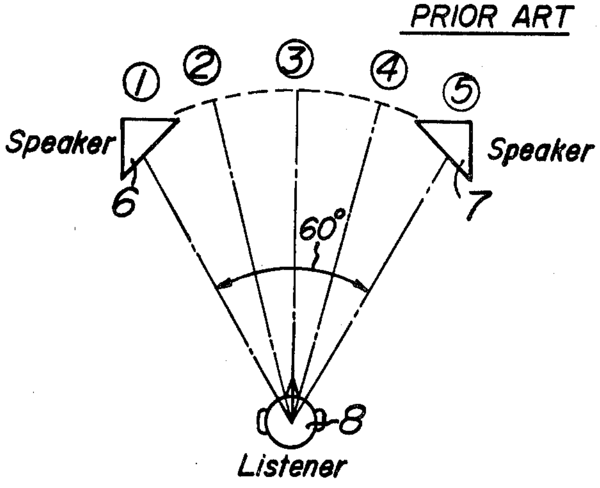
FIG. 5a PRIOR ART
FIGS. 5*a* and *b* are schematic diagrams showing the sound field formed respectively by a conventional reproducing device and by the sound field expanding device according to the present invention.

When the original sound images, which are formed by the left and right channel original sound signals L and R derived from the two channel stereo sound source 1 and then supplied directly to the left and right side loudspeakers 6 and 7, are localized in the directions ①to⑤shown in FIG. 5*a*, an angle subtended by the original sound field consisting of these sound images is narrow, for instance, 60°, as shown in FIG. 5*a*.

Figure 5B:
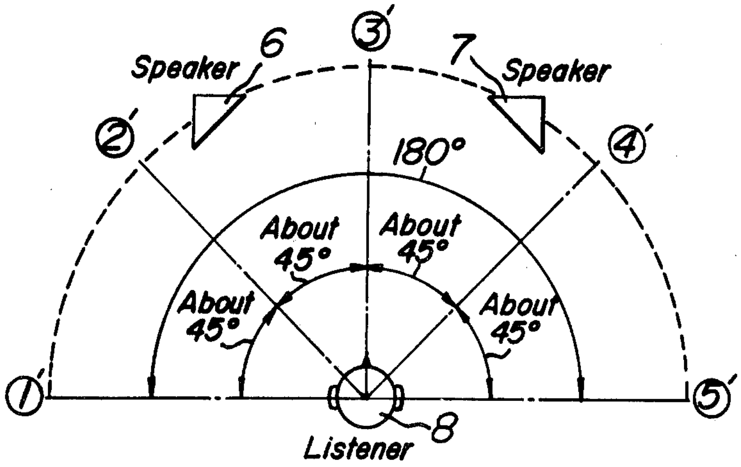

On the other hand, if the renewed sound images which are formed by theleft and right channel mixed output sound signals L' and R' derived from the left and right side sound image localizers 2 and 3 as mentioned above and then supplied to the left and right side loudspeakers 6 and 7 are localized in the direction of①' to⑤' shown in FIG. 5*b*, an angle subtended by the renewed sound field consisting of the renewed sound images can be expanded by three times of that shown in FIG. 5*a*, namely, 180°. Of course, the angle subtended by the renewed sound field can be set at any value by adjusting the left and right side sound image localizers 2 and 3, but it is difficult theoretically to expand the renewed sound field beyond a line whereon the left and right ears of the listener 8 are positioned.

Furthermore, when the embodiment shown in FIG. 4 with regard to the two channel stereo sound signal is applied respectively for localizing left and right channel sound signals of both the front and rear sides; that is, a pair of the sound field expanding devices shown in FIG. 4 is used for forming sound fields arranged respectively along the front and rear sides of the listener, and, for instance, left and right channel sound signals of the front and rear sides reproduced from a four channel stereo sound disc are used respectively as respective two channel stereo sound signal sources of the front and rear sides, it is possible to apply the sound field expanding device according for the present invention to expanding a sound field reproduced by the four channel stereo sound signal, and to obtain the same effects as mentioned above. But it is also difficult theoretically to expand the renewed front or rear side sound field beyond the line on which the left and right ears of the listener 8 are positioned, and besides it is also difficult theoretically to expand a sound field formed by front and rear side sound signals of left or right channel only in the same manner as mentioned above.

In the sound field expanding device according to the present invention, the number of reproducing loudspeakers is restricted to two, that is, one for the left side and one for the right side, as shown in FIGS. 4 and 5, with respect to the front or rear side of the listener 8. If extra loudspeakers are arranged between these two speakers, and are supplied respectively with sound signals having their levels and phases adjusted adequately, sound images can be formed much more clearly as the number of speakers used is increased. However, because the sound field expanding device becomes more complicated and expensive, an object of the present invention is lost.

The effects obtained by the sound field expanding device according to the present invention have been verified by our experiments, and the directions wherein the sound images are localized in the sound field formed by the expanding device according to the present invention can be calculated as follows.

In order to calculate the left and right channel mixed output sound signals L' and R' which should be supplied to the left and right side loudspeakers 6 and 7 in the embodiments shown in FIGS. 4 and 6 of the expanding device according to the present invention, the following equations (1) and (2) can be used.

$$L' = L + A(f)\cdot e^{j\theta(f)}\cdot R \quad (1)$$

$$R' = A(f)\cdot e^{j\theta(f)}\cdot L + R \quad (2)$$

where L' and R' show respectively amounts of the respective channel mixed output sound signals, L and R show respectively amounts of the respective channel input sound signals, and A(*f*) and θ(*f*) show respectively coefficients relating respectively to levels and phases of the sound signals in the respective frequency bands.

Accordingly, the values of these coefficients A(*f*) and θ(*f*) in equations (1) and (2) vary with the frequency bands of the sound signals which pass respectively through the filters 9 and 10 comprising the sound image localizers shown in FIG. 6. A typical example of the calculation when the frequency of the sound signal applied to the device is 900 Hz, and the angle subtended between the left and right side loudspeakers is set at 60°, which is the used case in listening to stereo sound, is shown as follows.

Figure 7:
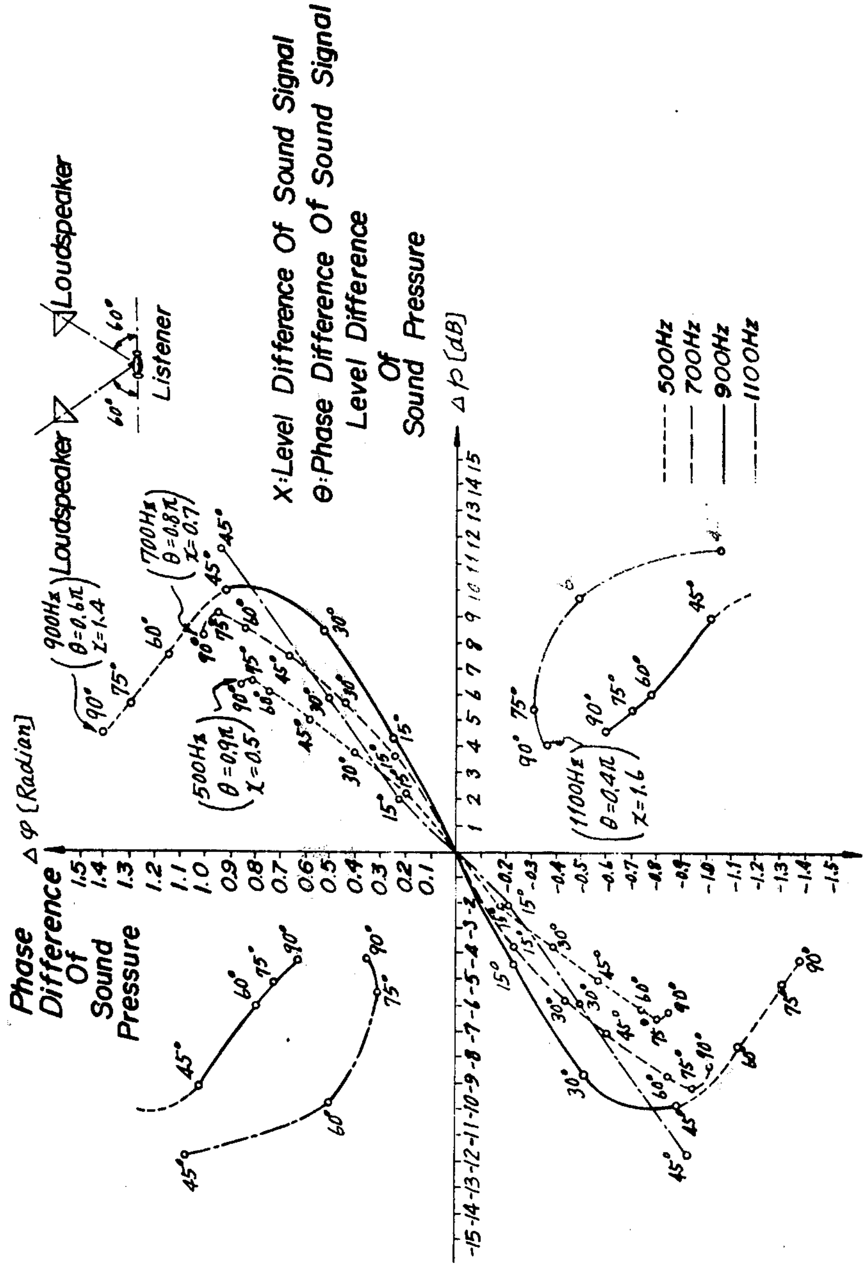
FIG. 7 is a graph showing the relationship between the level and phase differences in different frequency bands of sound pressures produced at the entrances of the ears of the listener.

When the angle subtended between the respective side loudspeakers is 60°, characteristics curves showing the relationship between the level and phase differences of sound pressures produced at the entrances of the ears of the listener by real sound sources of several typical frequencies and being added respectively with crossing points against respective similar characteristics curves relating to sound images reproduced by respective channel sound signals having typical values of phase and level differences, are shown in FIG. 7, which has been drawn in the same manner as FIG. 2.

On the other hand, if the original sound images localized respectively in the directions①to⑤shown in FIG. 5*a* are modified respectively to the renewed sound images localized respectively in the directions①' to⑤' shown in FIG. 5*b* by virtue of the sound field expanding device shown in FIG. 4, the left and right channel original input sound signals L and R supplied respectively to the left and right side loudspeakers 6 and 7 as shown in FIG. 5*a* and the left and right channel mixed output sound signals L' and R' supplied respectively to the left and right side loudspeakers 6 and 7 as shown in FIG. 5*b* are related with each other by the following equations (3) and (4). That is, $$L' = L + 1.4e^{j0.6\pi}\cdot R \quad (3)$$

$$R' = 1.4e^{j0.6\pi}\cdot L + R \quad (4)$$

These equations (3) and (4) are obtained as follows.

In the above-mentioned case, the level and phase coefficients A(*f*) and θ(*f*) of the equations (1) and (2) mentioned above are respectively 1.4 and 0.6π, which values can be obtained with reference to the curve of 900 Hz shown as a typical case in FIG. 7, which shows a locus of the relationship between the level and phase differences $\Delta p$ and $\Delta\psi$ of sound pressures caused by the real sound source supplying a sound signal of Hz.

Then, if it is assumed that the real sound images are settled respectively on the positions①,②and③shown in FIG. 5*a*, the above-mentioned relations between the respective sound signals L, R, L' and R' and the level and phase differences $\Delta p$ and $\Delta\psi$ of sound pressures at the entrance of the ears of the listener 8 can be derived from equations (3) and (4) in relation to the real sound images as shown in the following Table 2.

Table 2

| Sound image | L | R | L' | R' | Δp | Δψ |
|---|---|---|---|---|---|---|
| ① | 1.0 | 0 | 1.0 | $1.4e^{j0.6\pi}$ | −4.5 dB | $+0.4\pi$ |
| ② | 1.0 | 0.3 | $(1+0.42e^{j0.6\pi})$ | $(1.4e^{j0.6\pi}+0.3)$ | −10 dB | $-0.8\pi$ |
| ③ | 1.0 | 1.0 | 1.0 | 1.0 | 0 | 0 |

It is evident as a result of plotting on the 900 Hz curve of FIG. 7 respective combinations of values of the level difference $\Delta p$ and the phase difference $\Delta\psi$ shown in Table 2, that the original sound images ①, ② and ③ shown in FIG. 5*a* are shifted respectively into the directions of left 90°, left 45° and zero degree; that is, the sound images can be formed at the positions ①', ②' and ③' shown in FIG. 5*b*. Similarly, the real sound images ④ and ⑤ positioned symmetrically with respect to the original sound images ② and ① in FIG. 5*a* are shifted respectively to the positions ④' and ⑤' arranged symmetrically with respect to the sound images ②' and ①' in FIG. 5*b*.

Figure 8:
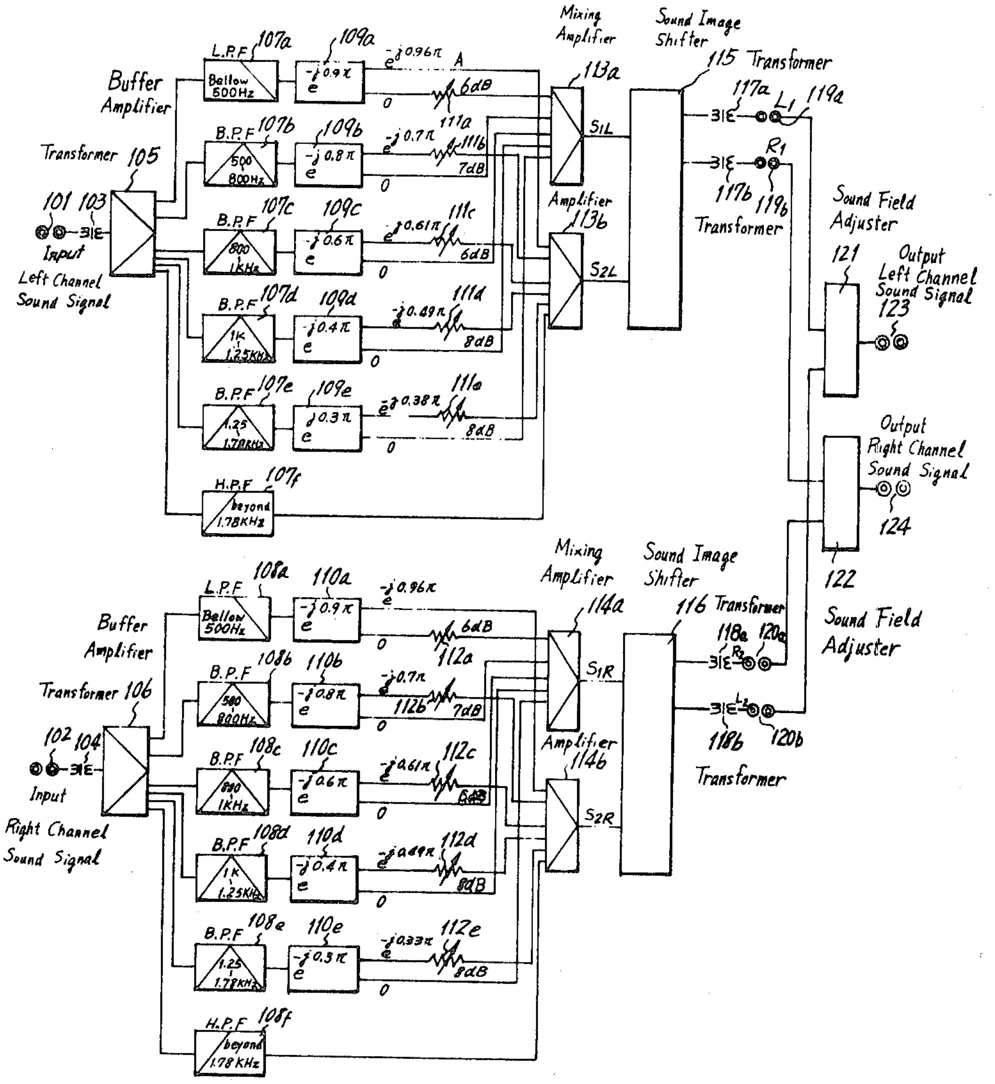
FIG. 8 is a block diagram showing a preferable embodiment of the sound field expanding device according to the present invention.

Next, another more practical embodiment of the sound field expanding device according to the present invention is shown in FIG. 8.

In FIG. 8, left and right channel input sound signals are supplied respectively through buffer amplifiers 105 and 106 to respective sound image localizing sections which are arranged in a similar manner to that shown in FIG. 6, and are divided respectively into several components having respective frequency bands succeeding with each other by low pass, band pass and high pass filters 107*a–f* and 108*a–f*. The high pass filters 107*f* and 108*f* can be regarded as a band pass filter having the highest pass band. The filters 107*a–f* and 108*a–f* pass respectively sound signal components of respective frequency bands 0–500 Hz, 500–800 Hz, 800 Hz–1 KHz, 1–1.25 KHz, 1.25–1.78 KHz and higher than 1.78 KHz, and in these frequency bands, typical frequencies are respectively 500 Hz, 700 Hz, 900 Hz, 1100 Hz and 1500 Hz. The sound signal components of the highest frequency band are not related the localization of sound images, so these highest frequency components are directly mixed into output sound signals of the sound image localizing sections.

The respective sound signal components mentioned above can be adjusted respectively in phases and levels by phase shifters 109*a–e* and by attenuators 111*a–e* and 112*a–e* in the same manner as in the embodiment shown in FIG. 6, so as to shift respective original sound images to the left and right side of the listener which should be localized originally in the directions wherein the respective side loudspeakers are positioned.

The respective sound signal components adjusted as mentioned above are respectively mixed by mixing amplifiers 113*a–b* and 114*a–b*, and respective channel mixed output sound signals $S_{1L}$, $S_{2L}$ and $S_{1R}$, $S_{2R}$ are supplied respectively to sound image shifter 115 and 116.

When the above-mentioned respective channel mixed output sound signals $S_{1L}$, $S_{1R}$, $S_{2L}$ and $S_{2R}$ derived respectively from the sound image localizing sections are directly supplied to the respective side loudspeakers, the reproduced sound field has the widest expanded range; that is, it subtends the widest angle of 180°. However, it is frequently required in practice to shift the reproduced sound images, or to somewhat narrow the sound field reproduced as mentioned above. Accordingly, the respective channel mixed output sound signals can be treated by the sound image shifters 115 and 116 and then by sound field adjusters 121 and 122 as follows, so as to shift the reproduced sound images as a whole and to narrow the expanded sound field somewhat as a whole.

Figure 9:
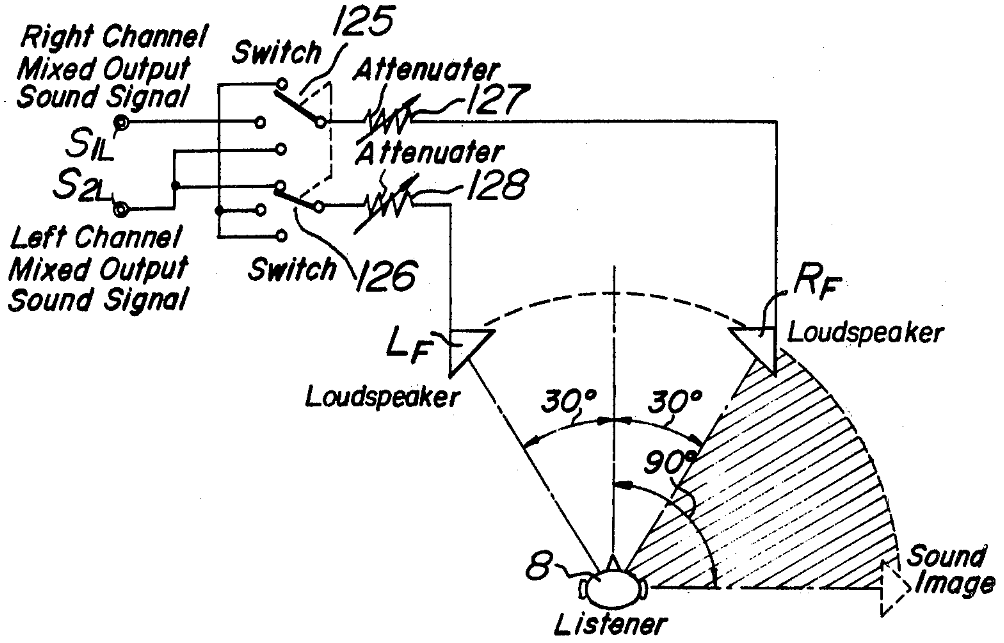
FIG. 9 is a schematic diagram showing an embodiment of a sound image shifter to be added to the sound field expanding device of the invention.

FIG. 9 shows schematically an embodiment of the sound image shifter mentioned above. In FIG. 9, the respective channel mixed output sound signals $S_{1L}$ and $S_{2L}$ are respectively supplied attenuators 127 and 128, and then respective channel attenuated output sound signals are supplied respectively to the left and right side loudspeakers LF and RF.

In order to shift a sound image exactly or to narrow a sound field exactly, it is required to divide the sound signal into several as many successive components having respectively as narrow frequency bands as possible, and to adjust individually levels and phases of the respective components, and then to mix the individually adjusted component signals, as mentioned above with regard to the embodiment shown in FIG. 6. However, with a view toward simplifying the configuration of the whole device, it is preferable that the levels of the respective channel mixed output sound signals only are adjusted as a whole by the attenuators for the purpose of shifting the reproduced sound images or narrowing the reproduced sound field.

In FIG. 9, for instance, in shifting the reproduced sound image to a direction of 60°, which has been localized in the direction of 90° by setting the coefficients $A(f)$ and $\theta(f)$ of equations (1) and (2) respectively at 1.4 and $0.6\pi$; that is, by setting the respective channel mixed output sound signals as follows, $$L' = S_1 + 1.4e^{j0.6\pi}\cdot S_2 \tag{3'}$$

$$R' = 1.4e^{j0.6\pi}\cdot S_1 + S_2 \tag{4'}$$

the phase coefficient $\theta(f)$ remains at the value $0.6\pi$ mentioned above, and the level coefficient $A(f)$ only is varied to 0.7 with reference to the curve shown in FIG. 7 by adjusting attenuators 127 and 128. For another instance, when shifting the reproduced sound image mentioned above in a direction of 30°, it is enough to supply an output sound signal only to the right side loudspeaker RF in FIG. 9; that is to set the respective attenuations of the attenuators 127 and 128 respectively at zero and infinity. For further another instance, when shifting the reproduced sound image mentioned above in front of the listener 8; that is, in a direction of zero degree, both attenuations of the attenuators 127 and 128 should be equal. Selecting switches 125 and 126 shown in FIG. 9 can be set in response to directions in which the reproduced sound image should be shifted.

Figure 10:
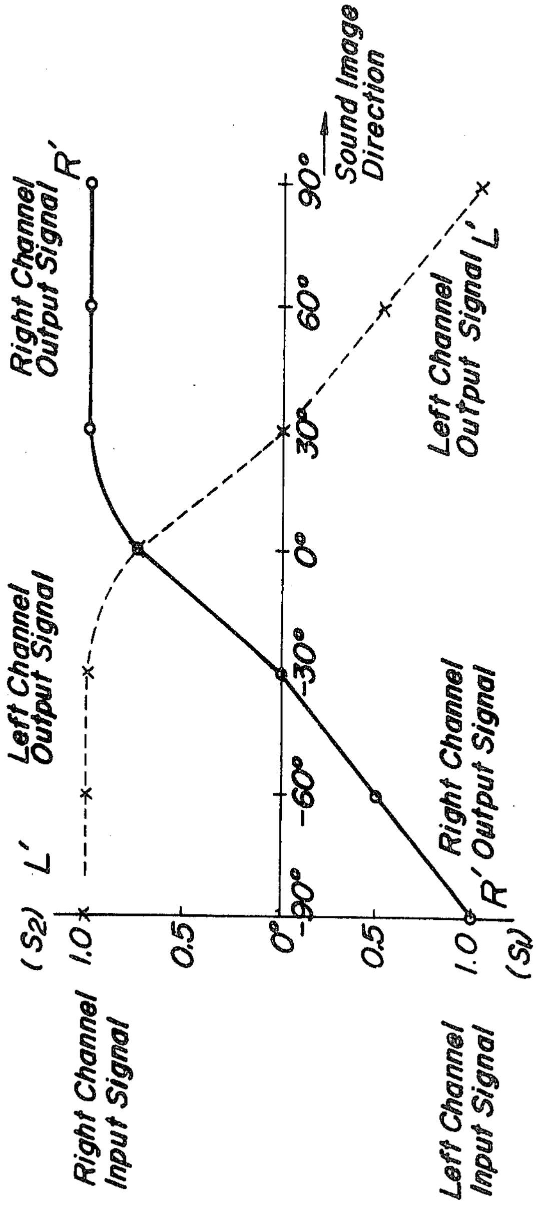
FIG. 10 is a graph showing the state of sound images shifted by the sound image shifter shown in FIG. 9.

FIG. 10 shows the relative levels of the respective channel mixed output sound signals L' and R' to be supplied to the respective side loudspeakers LF and RF which are formed respectively by attenuating the respective channel input sound signals $S_1$ and $S_2$, in response to the directions in which the reproduced sound image should be shifted.

FIG. 11 shows an embodiment of the above-mentioned sound field adjusters 121 and 122 shown in FIG. 8.

Figure 11A:
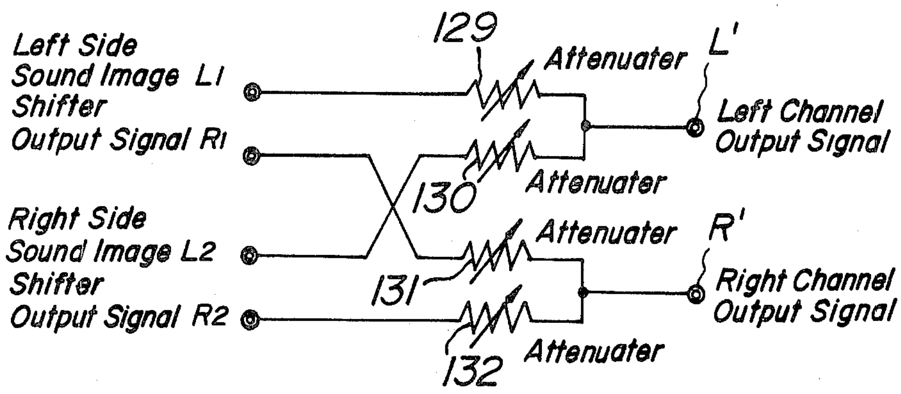
FIG. 11, including 11*a* and 11*b*, is a schematic diagram showing an embodiment of a sound field adjuster added to the sound field expanding device of the invention.
Figure 11B:
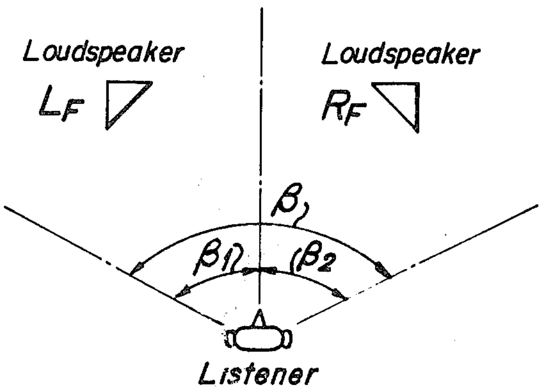

In FIG. 11*a*, the respective channel mixed output sound signals $L_1$, $R_1$, $L_2$, $R_2$ derived from the sound image localizing sections shown in FIG. 8 are supplied respectively to attenuators 129, 130, 131 and 132, and then attenuated respective channel output sound signals L' and R' are formed in order to narrow the angle subtended by the reproduced sound field into angles $\beta_1+\beta_2=\beta$ shown in FIG. 11*b*, by means of adjusting respectively the attenuaters 129, 130, 131 and 132.

As mentioned above, in the embodiment shown in FIG. 8, the respective component sound signals are adjusted respectively in levels and phases with reference to the characteristics curves of respective typical frequencies 500 Hz, 700 Hz, 900 Hz and 1100 Hz shown in FIG. 7, in the as manner as shown in the following Table 3.

In Table 3, the level and phase differences of the respective channel output sound signals of the typical frequency 1.5 KHz can be obtained by means of extrapolating of values of other typical frequencies, because the form of the characteristics curve of 1.5 KHz, which is plotted similarly to that shown in FIG. 2, is very complicated.

Table 3

| Filter | Frequency Band | Typical Frequency | Level Difference | Phase Difference |
|---|---|---|---|---|
| a | 0 - 500Hz | 500Hz | 0.5 | $0.9\pi$ |
| b | 500 - 800Hz | 700Hz | 0.7 | $0.8\pi$ |
| c | 800Hz - 1KHz | 900Hz | 1.4 | $0.6\pi$ |
| d | 1 - 1.25KHz | 1.1KHz | 1.6 | $0.4\pi$ |
| e | 1.25 - 1.78KHz | 1.5KHz | 1.8 | $0.3\pi$ |
| f | > 1.78KHz | — | 0 | 0 |

As mentioned earlier, by the sound image localizing method in which the present invention is based, a reproduced sound image cannot be shifted beyond the line at which the ears of the listener are positioned, because the reproduced sound image is localized with regard to level and phase differences of sound pressures caused at the entrances of the ears of the listener.

Figure 12:
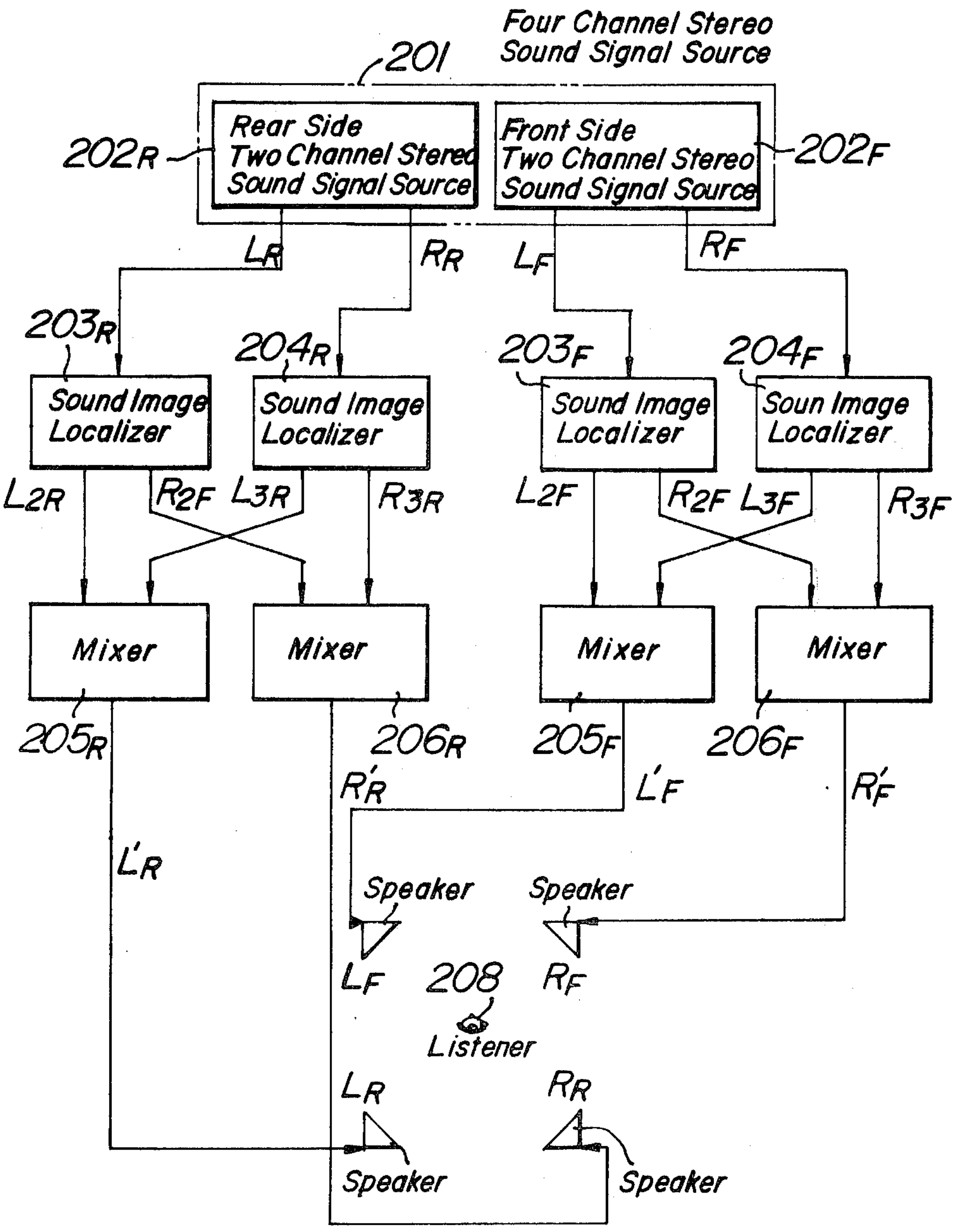
FIG. 12 is a block diagram showing an embodiment of a pair of the sound field expanding devices of the invention arranged for expanding a four channel stereo sound field.

Accordingly, if the present invention is employed for expanding a four channel stereo sound field, a pair of the sound field expanding devices as shown in FIG. 6 can be arranged respectively with regard to front and rear side two channel stereo sound signals, as shown in FIG. 12, and can be adjusted respectively in a similar manner as mentioned earlier with respect to the embodiment shown in FIG. 6, in order to reproduce a stereo sound field surrounding the listener 208.

Furthermore, the respective channel mixed output sound signals derived from the sound field expanding device as shown in FIG. 6 and FIG. 12 can be recorded on a conventional stereo sound recording member, for instance, on a conventional stereo sound disc or tape, and then these respective channel recorded sound signals can be reproduced and amplified simply and supplied to the respective side loudspeakers in the ordinary manner in order to reproduce an expanded stereo sound field without employing a sound field expanding device each time.

As explained above, the following remarkable effects can be obtained by the sound field expanding device according to the present invention.

(1) By adapting the sound field expanding device of the invention to a conventional stereo disc or tape player, it is possible to increase remarkably the stereo aural feeling caused by the reproduced sound field.

(2) It is possible to localize the sound images much more clearly and naturally by employing the sound field expanding device of the invention than by using a conventional device.

(3) The circuit configuration of the device according to the present invention can be simplified, so that the device becomes inexpensive.

(4) By combining a plurality of the sound field expanding devices according to the present invention, it is possible to reproduce easily the expanded sound field surrounding the listener, and to localize natural and clear sound images in such a surrounding sound field.

What is claimed is:

1. A sound field expanding device for generating a sound field expanded with respect to an original sound field, said original sound field being that produced by left and right loudspeakers obliquely positioned in front of a listener in the absence of said expanding device, comprising, left and right side sound image localizer means for receiving left and right channel sound signals respectively from a two channel stereo sound signal source and shifting the left and right side sound images to the left and right sides of the listener to produce an angular displacement of the sound images that is greater than that produced by said original sound field, each of said localizer means including a plurality of filters coupled to said sound signal source to receive a corresponding channel sound signal, said filters passing succeeding frequency band components of said channel sound signal, a plurality of phase shifters coupled to said plurality of filters for adjusting the phases of the frequency band components of said channel sound signal, a plurality of attenuators coupled to said plurality of phase shifters for attenuating the phase-shifted components of said channel sound signal, and a plurality of mixers coupled to said plurality of attenuators for mixing the phase-shifted attenuated components of said channel sound signal and generating respective channel localized output sound signals; and left and right side mixing means each coupled to the mixers of said left and right side sound image localizer means for mixing respectively left channel sound signals derived from both of said sound image localizer means and right channel sound signals derived from both of said sound image localizer means, said left and right side mixing means being coupled to said left and right side loudspeakers respectively.

2. A sound field expanding device as defined by claim 1 wherein said left and right side mixing means comprises, left and right side sound image adjuster means for shifting the reproduced sound images in the expanded sound field as a whole, and left and right side sound field adjusters for adjusting the angles subtended by said reproduced sound images.

3. A sound field expanding device for generating a sound field expanded with respect to an original sound field, said original sound field being that produced by left and right loudspeakers obliquely positioned in front of a listener in the absence of said expanding device, comprising left and right side sound image localizer means for receiving left and right channel sound signals respectively from a two channel stereo sound signal source and shifting the left and right side sound images to the left and right sides of the listener to produce an angular displacement of the sound images that is greater than that produced by said original sound field, each of said localizer means including a plurality of filters coupled to said sound signal source to receive a corresponding channel sound signal, said filters passing succeeding frequency band components of said channel sound signal, a plurality of phase shifters coupled to said plurality of filters for adjusting the phases of the frequency band components of said channel sound signal, a plurality of attenuators coupled to said plurality of phase shifters for attenuating the phase-shifted components of said channel sound signal, and a plurality of mixers coupled to said plurality of attenuators for mixing the phase-shifted attenuated components of said channel sound signal and generating respective channel localized output sound signals; and left and right side mixing means each coupled to the mixers of said left and right side sound image localizer means for mixing respectively left channel sound signals derived from both of said sound image localizer means and right channel sound signals derived from both of said sound image localizer means, said left and right side mixing means being coupled to at least one recorder means provided for recording output signals derived from said left and right side mixing means, so as to reproduce the recorded output signals of said left and right side mixing means from said recorder means for the purpose of applying the reproduced output signals of said left and right side mixing means to said left and right side loudspeakers respectively.

* * * * *